US008522827B2

(12) United States Patent
Lazzara et al.

(10) Patent No.: US 8,522,827 B2
(45) Date of Patent: Sep. 3, 2013

(54) PROTECTIVE SEAL FOR PIPELINE ASSEMBLY

(75) Inventors: Christopher J. Lazzara, Palm Beach Shores, FL (US); James R. Schwarz, West Palm Beach, FL (US)

(73) Assignee: Neptune Research, Inc., Lake Park, FL (US)

(*) Notice: Subject to any disclaimer, the term of this patent is extended or adjusted under 35 U.S.C. 154(b) by 408 days.

(21) Appl. No.: 12/897,938

(22) Filed: Oct. 5, 2010

(65) Prior Publication Data
US 2011/0079311 A1   Apr. 7, 2011

Related U.S. Application Data (60) Provisional application No. 61/249,103, filed on Oct. 6, 2009.

(51) Int. Cl.
*F16L 55/16*   (2006.01)
(52) U.S. Cl.
USPC ............................. 138/99; 138/97; 138/172
(58) Field of Classification Search
USPC .................................................. 138/99, 172
See application file for complete search history.

(56) References Cited

U.S. PATENT DOCUMENTS

| | | | | |
|---|---|---|---|---|
| 3,770,556 A | 11/1973 | Evans et al. | | 161/39 |
| 4,200,676 A | 4/1980 | Caponigro et al. | | 428/57 |
| 4,472,468 A | 9/1984 | Tailor et al. | | 428/57 |
| 4,519,856 A | 5/1985 | Lazzara | | 156/49 |
| 4,731,273 A | 3/1988 | Bonk et al. | | 428/57 |
| 4,732,632 A | 3/1988 | Pieslak et al. | | 156/86 |
| 4,803,104 A | 2/1989 | Peigneur et al. | | 428/35.1 |
| 4,961,978 A | 10/1990 | Doheny, Jr. et al. | | 428/40 |
| 5,030,493 A | 7/1991 | Rich | | 428/63 |
| 5,134,000 A | 7/1992 | Smythe et al. | | 428/34.9 |

(Continued)

FOREIGN PATENT DOCUMENTS

| | | |
|---|---|---|
| EP | 0309597 | 4/1989 |
| FR | 1529246 | 6/1968 |
| GB | 870165 | 6/1961 |
| GB | 1078559 | 8/1967 |
| WO | 90/12235 | 10/1990 |

OTHER PUBLICATIONS

Rehberg et al., "High Performance Coating for Pipelines Laid by Horizontal Directional Drilling", *3R International*; Special Edition; p. 27; Jan. 2008.

(Continued)

*Primary Examiner* — Patrick F Brinson
(74) *Attorney, Agent, or Firm* — Nixon Peabody LLP (57) ABSTRACT

A protective seal, a protective seal kit, and a method for sealing a joint region between pipes are provided. The protective seal includes a first wrap, comprising a corrosion-resistant material, wrapped around a seal region, contacting the outer surface of the pipeline assembly. A second wrap, comprising a self-adhering fiberglass composite, wraps around the first wrap. The kit includes a flexible wrap fabricated, in part, from a corrosion-resistant material, and a second flexible wrap fabricated, in part, from a fiberglass cloth impregnated with a resinous pliable-plastic material. The method includes wrapping a corrosion-resistant, inner wrap around first and second pipes such that this wrap surrounds the joint region and adheres to the pipes. A fiberglass-composite outer wrap is wrapped around the inner wrap and the first and second pipes such that the outer wrap surrounds the inner wrap and adheres to the pipes. The outer wrap is cured.

24 Claims, 5 Drawing Sheets

(56) References Cited

U.S. PATENT DOCUMENTS

| | | | |
|---|---|---|---|
| 5,175,032 A | 12/1992 | Steele et al. | 428/34.9 |
| 5,302,428 A | 4/1994 | Steele et al. | 428/34.9 |
| 5,411,777 A | 5/1995 | Steele et al. | 428/34.9 |
| 5,662,974 A | 9/1997 | Andrenacci et al. | |
| 5,786,053 A | 7/1998 | Andrenacci et al. | |
| 5,894,864 A | 4/1999 | Rich | 138/99 |
| 5,931,198 A | 8/1999 | Raji et al. | 138/98 |
| 7,513,275 B2 * | 4/2009 | Lazzara | 138/99 |
| 7,938,146 B2 * | 5/2011 | Brooks et al. | 138/99 |
| 2006/0272724 A1 * | 12/2006 | Borland et al. | 138/99 |
| 2007/0125437 A1 | 6/2007 | Lazzara | 138/99 |
| 2010/0237606 A1 | 9/2010 | Lazzara et al. | 285/123.12 |
| 2011/0079311 A1 | 4/2011 | Lazzara et al. | 138/99 |

OTHER PUBLICATIONS

Directional Technologies, Inc. Horizontal Directional Drilling Services; "Welcome to Directional Technologies, Inc."; *Horizontal Directional Drilling Web Site* http://www.directionaltech.com; (Aug. 13, 2009 (1 page).

Directional Technologies, Inc. Horizontal Directional Drilling Services; "Technology Overview for Directional Drilling"; *Horizontal Directional Drilling Web Site* http://www.directionaltech.com; (Aug. 13, 2009 (2 pages).

STOPAQ® FN 4100, Product Data Sheet; 1 page (Apr. 2008).

* cited by examiner

PROTECTIVE SEAL FOR PIPELINE ASSEMBLY

CROSS-REFERENCE TO RELATED APPLICATION

This application claims the benefit of and priority to U.S. Provisional Patent Application No. 61/249,103, filed on Oct. 6, 2009, which is hereby incorporated by reference herein in its entirety.

TECHNICAL FIELD

The present disclosure relates generally to pipes and pipeline assemblies, and more particularly to protective wraps for pipes and pipeline assemblies.

BACKGROUND

Conduit assemblies, such as pipelines and hydraulic circuits, are used to transport an assortment of fluids, such as water, oil, various natural and synthetic gases, sewage, slurry, hazardous materials, and the like. Similar structures are utilized for transmitting electrical and fiber optic cabling across vast expanses of land in establishing telecommunication networks.

Utility pipelines are formed from a variety of materials, including, for example, concrete, plastic (e.g., polyvinyl chloride, polyethylene), and various metallic materials, such as iron, copper, and steel. The outer surfaces of metal pipes, when used in outdoor applications, are typically provided with a corrosion-resistant, protective coating. Such coatings can include a thermoset polymer coating.

In laying pipelines, many of the individual pipes are buried underground. In applications where pipelines are routed underground, passing, for example, under roadways, railroads, buildings, and/or rivers, it is generally not practical to dig a trench in order to bury the pipes. Existing constructions, previously buried utilities, terrain constraints, and topographic restrictions may make trenching economically undesirable and/or physically impracticable.

One trenchless technique employed for burying pipeline assemblies is directional drilling. Directional drilling is generally typified as a process of boring a hole which is characterized in that the course of the bore hole in the earth is in a direction other than vertical—i.e., the axes make an angle with the vertical plane (known as "vertical deviation"), and are directed in the azimuth plane. Conventional directional boring techniques traditionally operate from a boring device or machine that pushes and/or rotates a drill string consisting of a series of connected drill pipes with a directable drill bit to achieve an underground path through which the pipeline assembly can be installed.

Due to practical limitations, the pipeline assembly generated from directional drilling is typically not a single elongated pipe, but rather a plurality of shorter pipes that are subsequently joined together. The pipes are generally joined by welding, such welding typically being performed in the field (therefore commonly known as "field welded joints"). Field welding generally requires any protective coating be removed to bare the underlying steel in the joint region such that the coating materials do not interfere with or denigrate the welding procedure.

One prior art approach for sealing field weld joint regions involves sintering polyethylene material in a mold that is positioned around the joint, thereby formulating a mil coating around the joint. Another approach is to fit an elongated, heat-shrinkable ("recoverable") sleeve around the joint region. Recoverable sleeves are generally provided with an inner-diameter coating of hot-melt adhesive that is activated through the heat-shrinking process. Both of these prior art approaches, however, are complex, time-consuming, and costly, often requiring several man-hours to create a single seal.

In cases of trenchless pipe laying, such as directional drilling, coating materials of pipes and joints are particularly stressed by enormous abrasion and shear forces. For instance, as the pipes are dragged or pushed through the bore hole, there is likely to be inadvertent contact with gravel, soil, rock formations, and the like. The abrasion stresses and scarring of directional drilling is exacerbated by previous sealing methodologies and seal structures.

SUMMARY

According to one embodiment of the present disclosure, a protective seal assembly is provided for sealing and protecting one or more regions of a pipeline assembly. The seal assembly includes a first wrap member that is wrapped around at least a portion of the seal region(s), contacting an outer surface of the pipeline assembly. The first wrap member includes a corrosion-resistant material. A second wrap member is wrapped around and circumscribes the first wrap member. The second wrap member includes a self-adhering fiberglass composite material.

In another embodiment of the present disclosure, a protective seal kit is provided for sealing at least one joint region between two or more pipes. The protective seal kit includes a first flexible wrap that is configured to wrap around the outer surfaces of the pipes and substantially surround the joint region(s). The first wrap is at least partially fabricated from a corrosion-resistant material. A second flexible wrap is configured to wrap around the outer surfaces of the pipes, and substantially surround the joint region and the first flexible wrap. The second flexible wrap is at least partially fabricated from a fiberglass cloth impregnated with a resinous pliable-plastic material configured to harden upon exposure to aqueous moisture.

In accordance with another embodiment of the present disclosure, a method is presented for sealing one or more joint regions between two or more pipes. The method comprises wrapping a flexible corrosion-resistant inner wrap around at least a portion of the pipes such that the inner wrap substantially surrounds the joint region and adheres to the outer surfaces of the joined pipes. A flexible fiberglass-composite outer wrap is wrapped around the inner wrap and at least a portion of the joined pipes such that the outer wrap substantially surrounds the inner wrap and adheres to the outer surfaces of the pipes. The flexible fiberglass-composite outer wrap is cured.

The above summary is not intended to represent each embodiment, or every aspect, of the present disclosure. Rather, additional aspects of the disclosure will be apparent to those of ordinary skill in the art in view of the detailed description of various embodiments, which is made with reference to the drawings, a brief description of which is provided below.

While this disclosure is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the disclosure.

DETAILED DESCRIPTION OF THE EXEMPLARY EMBODIMENTS

Protective seals, kits for creating protective seals, and methods for sealing joint regions between pipes are presented herein. In some embodiments of the present disclosure, the seal is designed to protect field welded joints on coated pipelines from the abrasion stresses of horizontal directional drilling. The systems and methods discussed herein are desirable because they increase efficiency and productivity while reducing labor and material costs that are associated with earlier methods. The resultant seal is unique in that it has a very low profile and is extremely conformable (e.g., may be employed across a broad spectrum of applications), while offering exceptional abrasion and impact resistance, as well as improved mechanical resiliency and corrosion protection.

Referring to the drawings, wherein like reference numbers refer to like components throughout the several views, FIGS. 1-3 and 5-8 illustrate an exemplary conduit (e.g., utility pipeline) assembly, indicated generally at 10. The drawings presented herein are provided purely for instructional purposes, and should therefore not be considered limiting. For instance, the particular pipeline arrangement shown in FIGS. 1-3 and 5-8 is exemplary in nature, and not limiting by implication. By way of example, the utility pipeline assembly is intended for transporting any of an assortment of fluids, such as water, oil, natural and synthetic gases, sewage, slurry, hazardous materials, etc. However, the present disclosure may be utilized in other pipeline assemblies, such as those housing fiber optic wires, electrical cabling, etc. In addition, the drawings presented herein are not to scale; thus, the individual and relative dimensions shown in the drawings are not to be considered limiting.

Figure 1:
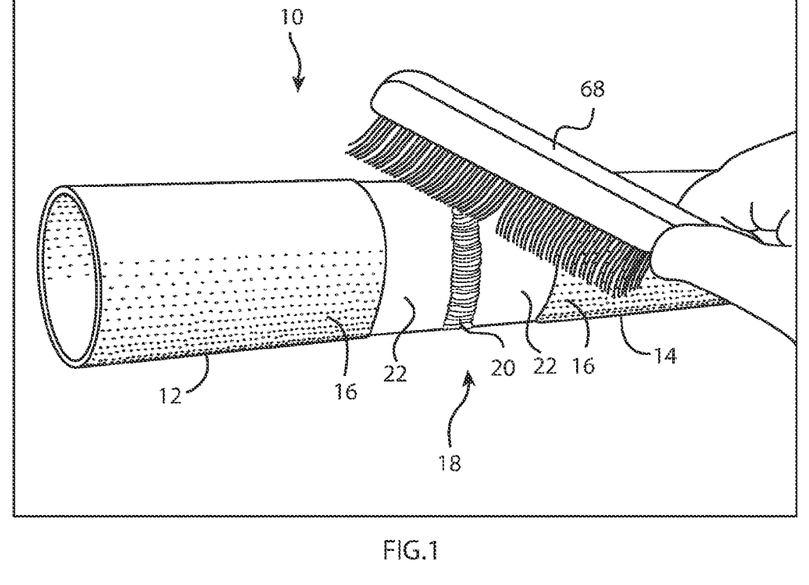
FIG. 1 is a perspective-view illustration of an exemplary pipeline assembly represented by two pipes connected via a field welded joint.
Figure 2:
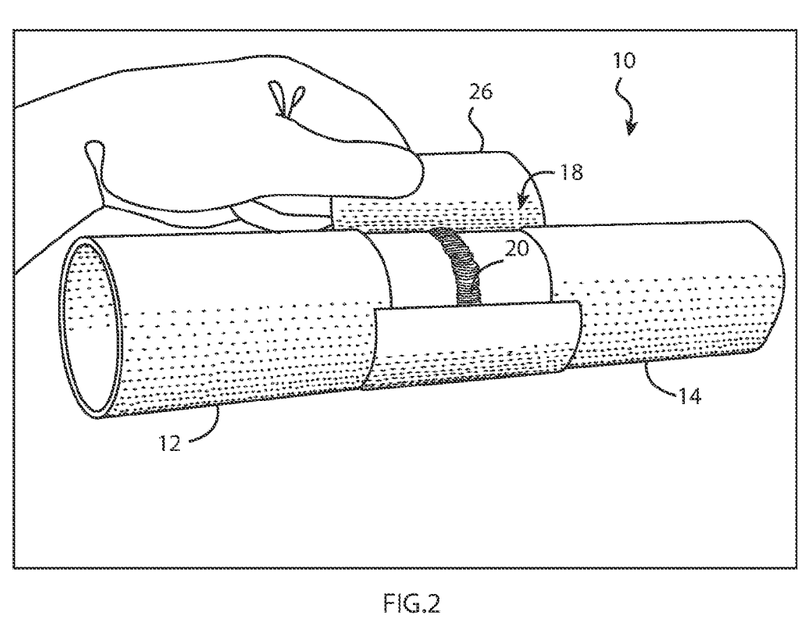
FIG. 2 is a perspective-view illustration of the exemplary pipeline assembly of FIG. 1, showing an exemplary flexible inner wrap in accordance with certain embodiments of the present disclosure being applied to the joint region of the pipeline assembly.

The utility pipeline assembly 10 of FIG. 1 includes a first, "leading" pipe 12 and a second, "trailing" pipe 14. Each of the pipes 12 and 14 may be constructed of any feasible material having sufficient strength and resiliency for the intended use of the pipeline assembly 10. By way of example, and not limitation, the pipes 12, 14 of FIG. 1 are fabricated from a material that can withstand significant internal and external loading, such as those that exist by reason of surrounding formations (e.g., when the pipeline assembly 10 is buried underground), as well as any additional loads exacted thereto (e.g., due to internal fluid pressures, existing constructions, varying surface loads, etc.). In the illustrated embodiment, the pipes 12, 14 consist of elongated steel cylinders with a topcoat 16 evenly disseminated over the exterior surfaces of the pipes 12, 14. The top coat 16 may include, for example, a thermoset polymer coating, such as a fusion bonded epoxy. Alternatively, the pipes may be fabricated from other metallic and polymeric materials.

FIGS. 1-3 and 5-8 show the first and second pipes 12 and 14 as coterminous, coaxially-aligned cylinders. However, the length and diameter of each pipe 12, 14 may be individually or collectively varied. To that end, the pipes 12, 14 may be axially misaligned without departing from the scope and spirit of the present disclosure. Moreover, although illustrated as cylindrical components, the first and second pipes 12, 14 may take on other geometric cross-sections (e.g., elliptical, square, rectangular, triangular, etc.) without departing from the present disclosure. Finally, the utility pipeline assembly 10 may comprise more or fewer pipes than those shown in FIGS. 1-3 and 5-8.

The exemplary pipeline assembly 10 of FIG. 1 has a joint region, designated generally at 18, whereat the leading and trailing pipes 12, 14 interface and connect. Various techniques for joining the pipes 12, 14 are readily available (e.g., via industrial-strength adhesives, intermeshing helical threading, boots, clamps, and other mechanical fastening means). In this particular application, the two pipes are joined by welding. By way of example, the pipes may be joined by arc welding techniques, including the various methods of shielded metal arc welding (SMAW) and gas metal arc welding (GMAW), which is sometimes referred to by its subtypes metal inert gas (MIG) welding or metal active gas (MAG) welding. In the illustrated embodiment, the resultant weld joint 20 extends continuously around the perimeter of the interface between the two pipes 12, 14.

Prior to joining the two pipes 12, 14, any protective topcoat 16 in the immediate vicinity of the pipe interface is removed to expose the underlying steel in surrounding areas 22 of the weld joint 20. A high-pressure particulate device, such as a pneumatic sandblaster (not shown), or a roughening device, such as a wire brush, power brush, may be used to remove the pipe coatings, as well as any rust, paint, and other foreign matter from the pipeline assembly. Alternatively, the pipes 12, 14 may be prefabricated with a topcoat 16 that is applied such that the surrounding areas 22 are left exposed.

A protective seal assembly is shown in accordance with certain embodiments of the present disclosure, indicated generally by reference numeral 24. The protective seal assembly 24 is configured, as described below, to cover, seal, and/or protect the joint region 18 (also referred to herein as "seal region"). In some embodiments, the protective seal assembly 24 is designed to protect field welded joints on coated pipelines from the abrasion stresses of horizontal or directional drilling. As will be readily apparent from the following description, the protective seal assembly 24 is unique in that it has a very low profile (e.g., a 90% reduction in thickness as compared to prior art covers). For example, in some embodiments, the first and second wrap members 26, 28 collectively increase the outer diameter of the pipeline assembly 10 by less than approximately 20 mm at the center of the protective seal assembly 24 (e.g., at the joint region 18). According to some embodiments, the first and second wrap members 26, 28 collectively increase the outer diameter of the pipeline assembly 10 by less than approximately 14 mm at the center of the protective seal assembly 24 (e.g., at the joint region 18). In another embodiment, the first and second wrap members 26, 28 collectively increase the outer diameter of the pipeline assembly 10 by less than approximately 10 mm at the center of the protective seal assembly 24 (e.g., at the joint region 18). In even yet another embodiment, the first and second wrap members 26, 28 collectively increase the outer diameter of the pipeline assembly 10 by less than approximately 10%, and in some embodiments by less than approximately 1-2%, at the center of the protective seal assembly 24 (e.g., at the joint region 18). Moreover, the protective seal assembly 24 is highly impact resistant, and is easier to apply than its conventional counterparts. In addition, the protective seal assembly 24 is extremely conformable in that it can be utilized in pipeline assemblies of varying geometries, having variable diameters (due to different pipes and coating thicknesses), and with an assortment of irregularities.

Figure 5:
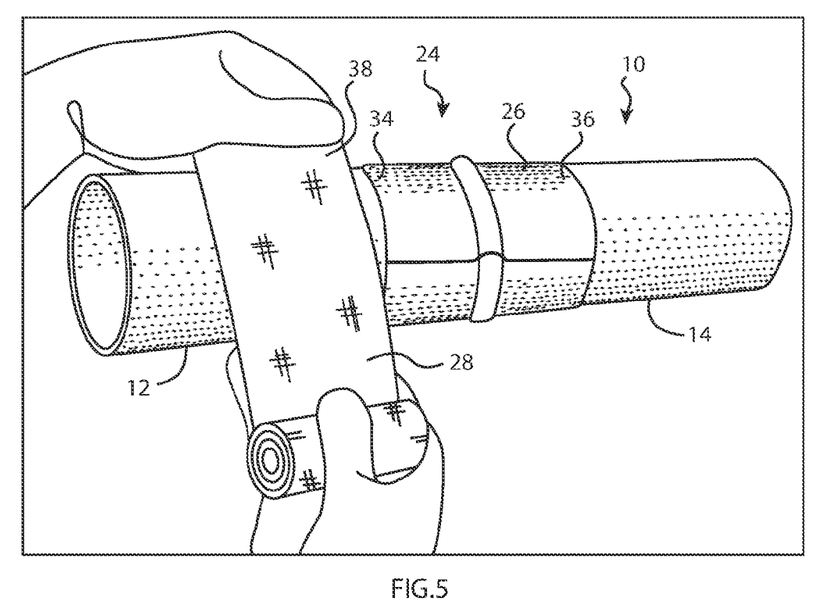
FIG. 5 is a perspective-view illustration of the exemplary pipeline assembly of FIGS. 1-3, showing the outer wrap of FIG. 4 being applied to a portion of the joint region of the pipeline assembly.

Looking at FIG. 5, the protective seal assembly 24 comprises (is inclusive of, but not exclusive to) two primary components: a first wrap member 26 (also referred to herein as "first flexible wrap" and "inner wrap") and a second wrap member 28 (also referred to herein as "second flexible wrap" and "outer wrap"). The first wrap member 26 is wrapped around at least a portion of the seal region 18, contacting the outer surface of the pipeline assembly 10. In the illustrated example, the first wrap member 26 presses directly against the exposed outer surfaces of the pipes 12, 14, circumscribing the weld joint 20 and encasing the entire joint region 18. In some embodiments, the first wrap member 28 is fabricated from a corrosion-resistant polymeric material. One example of a polymeric material suitable for the present disclosure is a self-adhering, viscoelastic polyisobutene.

In accordance with certain facets of the present concepts, the polymeric material is an inert, amorphous, non-cross linked monolithic polymer wrap, such as a 4 inch (101.6 mm) wide 1.8-2.2 mm thick STOPAQ® Wrappingband, manufactured by STOPAQ Europe B.V., Gasselterstraat 20, 9503 JB Stadskanaal, Netherlands. The polymeric wrap of this example is impervious to water, and has a very low gas- and water-vapor permeability (e.g., 0.2 g/m$^2$/day (ASTM E 96)). Moreover, the polymeric wrap may be non-toxic, exhibits no cathodic disbondment and no adhesive failure at approximately 23° C. and 70° C., and adheres extremely well to steel and standard pipe coatings. The polymer may be viscous at temperatures of use (e.g., −45° C. up to +70° C. (cold flow)), and therefore flow into irregularities on metallic surface, adhering to the substrate at a molecular level. Other non-limiting alternatives for the first wrap member 28 include wax tapes, petrolatum tapes, and epoxies. One such example is the Wrapid Bond™ wrap, manufactured by Canusa-CPS of Toronto, Ontario and The Woodlands, Tex.

The second wrap member 28 is wrapped around and circumscribes the first wrap member 26. For instance, in the illustrated example, the second wrap member 28 presses directly against the first wrap member 26 and a portion of the coated outer surfaces of the pipes 12, 14, encasing the entire wrap member 26 and weld joint 20. In this regard, the outer wrap 28 operates as a cocoon for the inner wrap 26 and weld joint 20, creating a structurally reinforcing, water-tight, and corrosion-resistant shield.

In the exemplary configuration presented in FIGS. 4-8, the second wrap member 28 can be fabricated from a fiberglass composite material. The exemplary fiberglass composite preferably comprises a woven filament, fiberglass cloth. In accordance with certain facets of the present concept, the fiberglass composite is impregnated with a self-adhering, resinous pliable-plastic material that is preferably hardened by exposure to aqueous moisture (e.g., water). One such fiberglass composite wrap is the Syntho-Sleeve™ Wrap, manufactured by Neptune Research Inc., 1346 South Killian Drive, Lake Park, Fla. 33403, USA, which is the assignee of the present application. The fiberglass composite wrap of this example has a pre-curing thickness of approximately 2.6 mm and a post-curing thickness of approximately 2.5 mm. In other embodiments, the fiberglass composite wrap has a post-curing thickness of approximately 1.32 mm (e.g., for 4-layer applications) or approximately 1.27 mm (e.g., for 2-layer applications). In a non-limiting example, the constituent makeup of the outer wrap may comprise: polyether diol; polymethylenepolyphenyl isocyanate; diphenylmethane diisocyanate; triethyl phosphate; benzoyl chloride; morpholine; and/or dimorpholinoethane. To that extent, the resin may comprise: polyol (725 polypropolenalycol); diisocyanate (modified diphenylmethane); titanium dioxide; tinivun 770 and/or phosphoric acid. Aromatic and aliphatic issocianates are also possible materials for the resin. Other alternative makeups and resins are also envisioned as being within the scope and spirit of the present disclosure.

In some embodiments, the fiberglass composite wrap exhibits no cathodic disbondment and no back peeling at approximately 23° C. and 70° C., and sufficient cold flow characteristics (distortion, deformation, or dimensional change which takes place under static load at temperatures within the working range (sans heat softening)) to provide permanent inflow into the pores of the underlying substrate, thereby adhering to the substrate at a molecular level. In some embodiments, the fiberglass composite wrap provides an impact resistance of approximately 80-300 joules (J) or at least 90 J, and a tensile strength of approximately 20,000-39, 500 psi or at least 25,000 psi (ASTM D3039). Moreover, in other alternative facets, the wrap may provide for an abrasion resistance of approximately 2.0 mils/second, as well as substantially no cathodic disbondment.

Figure 9:
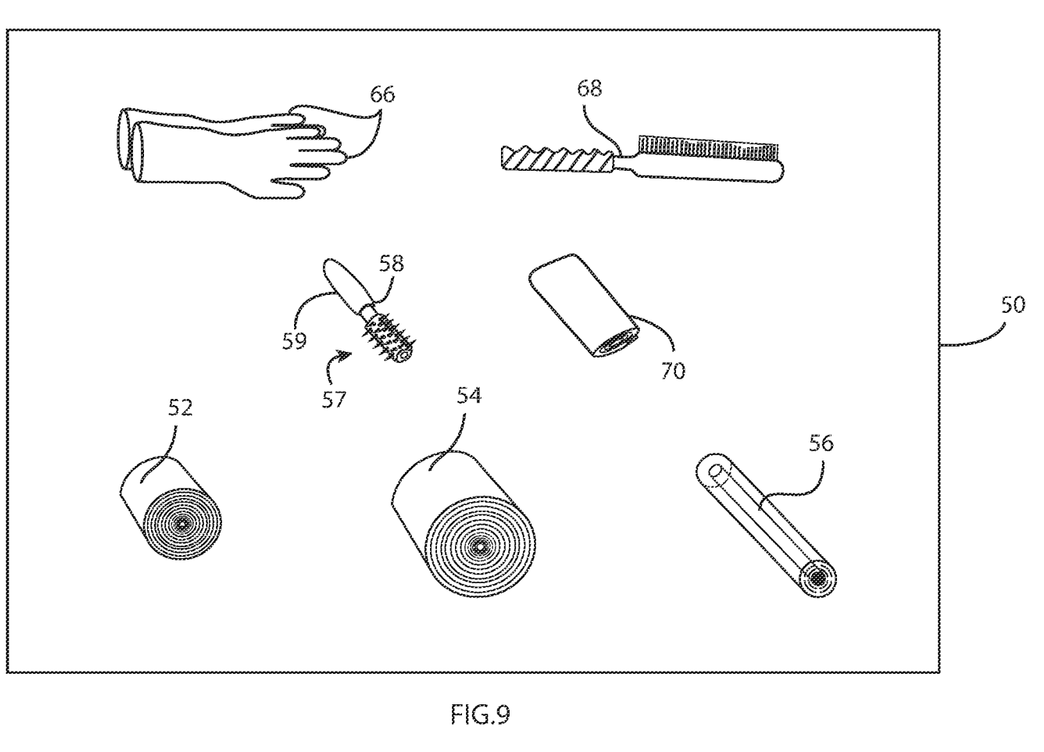
FIG. 9 is a perspective-view illustration of a protective seal kit in accordance with an embodiment for sealing one or more joint regions between two or more joined pipes.

A protective seal kit 50 for sealing at least one joint region between at least first and second pipes is illustrated in FIG. 9 in accordance with certain embodiments of the present disclosure. The protective seal kit 50 includes a first flexible wrap 52, such as the first wrap member 26 described above with respect to FIG. 2. For instance, the first flexible wrap 52 is configured to wrap around the joined pipes (e.g., first and second pipes 12, 14 of FIG. 1) and completely envelop the joint region(s) between the pipes. Also synonymous with the wrap 26 of FIG. 2, the first flexible wrap 52 can be fabricated, at least in part, from a corrosion-resistant material. Such corrosion-resistant materials includes self-adhering polymers, such as, for example, a viscoelastic polyisobutene.

The protective seal kit 50 presented in FIG. 9 also includes a second flexible wrap 54, such as the second wrap member 28 described above with respect to FIG. 5. By way of example, and not limitation, the second flexible wrap 54 is configured to wrap around the pipeline assembly such that the second flexible wrap 54 surrounds and envelops the joint region(s), the first flexible wrap 52, and at least a portion of the coated outer surface of each joined pipe. Also synonymous with the wrap 28 of FIG. 5, the second flexible wrap 54 can be fabricated, at least in part, from an elongated, woven fiberglass cloth impregnated with a resinous pliable-plastic material operable to harden upon exposure to aqueous moisture. In some embodiments, the flexible wraps 52, 54 should be stored in a dry, ventilated area, should be kept sealed in cartons to avoid exposure to direct sunlight, rain, snow, dust or other adverse environmental elements. Moreover, application of the flexible wraps 52, 54 may be desirable for some configurations at temperatures between 59°-77° F. (15°-25° C.).

Figure 8:
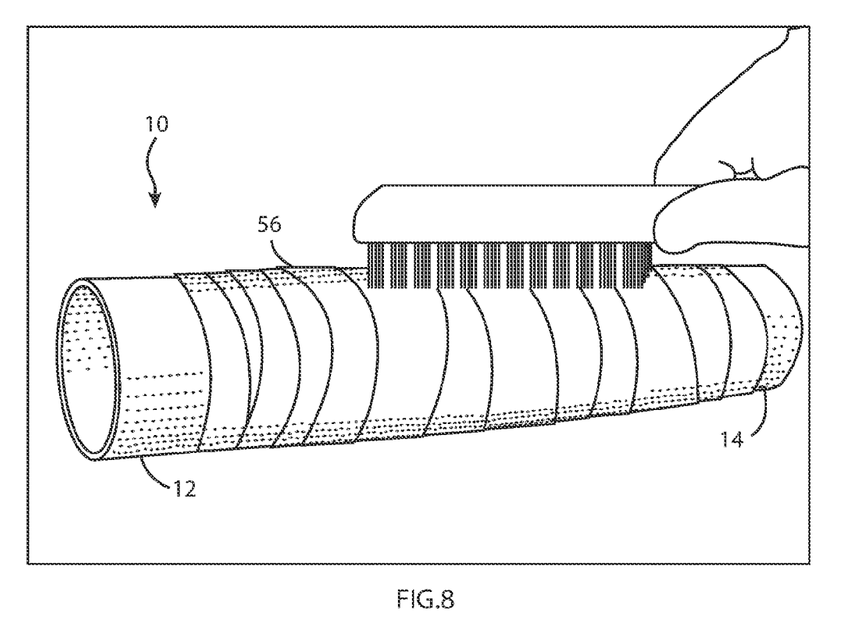
FIG. 8 is a perspective-view illustration of the exemplary pipeline assembly of FIGS. 1-3 and 5-7, showing an exemplary perforator tool puncturing the elastic wrap of FIG. 7.

In addition to the first and second flexible wraps 52, 54, the protective seal kit 50 may further comprise an elastic wrap 56 of sufficient length and width to surround the first and second flexible wraps 52, 54 and preferably at least a portion of the pipe(s) immediately adjacent to the protective seal (see, for example, FIG. 8). By way of example, and not limitation, the elastic wrap 56 may comprise a preferable polyethylene film or similar material. When applied, the elastic wrap 56 (also referred to herein as "compression film") may apply pressure to the wraps 52, 54, compressing and consolidating the two wraps 52, 54. In some embodiments, the elastic wrap 56 compresses the underlying layers of composite to ensure cure consolidation of the final form.

In practice, the elastic wrap 56 may also operate to evacuate gas that may result from curing of the fiberglass composite wrap 54 and build up underneath the elastic compression wrap 56. In this regard, the protective seal kit 50 may be equipped with a perforator tool, shown in one exemplary configuration at 58. The perforator tool 58 of FIG. 9 includes a plurality of spikes, designated generally at 57, that are rotatably mounted to a handle 59. An operator may manipulate the perforator tool 58 using the handle 59, and utilize the spikes 57 to puncture the preferable polyethylene film to thereby generate a plurality of perforations in the elastic wrap 56. In an alternative embodiment, the perforator tool 58 may be eliminated from the protective seal kit 50; the elastic wrap 56 coming prefabricated with a plurality of perforations.

Other components of the protective seal kit 50 of FIG. 9 may include protective gloves 66, a pipe roughening device 68, and a cleaning solvent wipe 70. The protective gloves 68 are adapted to be worn by a user in the preparation and application of any materials that may irritate the skin, which may be the case of the flexible fiberglass composite wrap 54 and cleaning solvent wipe 70. The protective gloves 68 are preferably nitrile gloves, but can be composed of any material that enables the protective gloves 68 to be used for their intended purpose.

The pipe roughening device 68 may be a wire brush (as seen in FIG. 9), or may take on other functional alternatives, such as a power sander, power brush, sandpaper and other materials adapted to clean and roughen a pipe surface. The cleaning solvent wipe 70 comprises a known solvent with sufficient cleaning capacity to remove hydrocarbon (oily) residue, particulate buildup, and other foreign matter from the outer surfaces of the first and second pipes. Such solvents include, but are certainly not limited to, acetone, toluene solvents, alcohol (e.g., >96%), MEK, and the like. In the alternative, the cleaning solvent wipe 70 may be replaced with an emulsion, a cleaning compound, or other similar materials and methods which involve a satisfactory cleaning action. A cloth or "shammy" and a solvent spray (not shown) could also replace the solvent wipe 70.

Some of the above-indicated components are considered optional, such as the perforator tool 58, protective gloves 66, pipe roughening device 68, and cleaning solvent wipe 70. It should also be readily recognized that the constituent parts of the protective seal kit 50 may be varied within the scope of the appended claims. In particular, the protective seal kit 50 may comprise additional, fewer, or alternative components from those which are illustrated in FIG. 9.

Improved methods for wrapping and sealing at least one joint region between at least first and second pipes are also presented herein. The methods or algorithms of the present disclosure are described with respect to the structure illustrated in FIGS. 1-8, and the collection presented in FIG. 9. However, the claimed methods of the present disclosure are not limited to the pipeline assembly 10 depicted throughout the drawings or the protective seal kit 50 illustrated in FIG. 9.

Turning then to FIG. 1, prior to fabrication of the protective seal assembly 24, the application surfaces of the leading and trailing pipes 12, 14 are first prepared. Such preparation may include cleaning and roughening the outer surface of each pipe 12, 14 within the joint region 18 using, for example, a wire brush (such as the pipe roughening device 68 of FIG. 9) or the various alternatives identified above. The cleaning and roughening operation is intended to remove any pipe coating remnants, mill scale, rust, rust scale, paint, loose materials, de-gloss, and other foreign matter. In some embodiments, the operator abrades not only the exposed metal surface areas 22, but also the coated pipe sections immediately adjacent thereto (e.g., approximately 5 mm onto each coated outer surface). In addition, any oils, greases, or other foreign contaminants are removed from the exposed pipe surfaces 22 by utilizing, for example, a cleaning solvent (e.g., solvent wipe 70 of FIG. 9). Finally, wet portions of the seal region are dried prior to applying either of the protective wraps 26, 28. Since the chemical composition of the cleaning solvent in the wipe 70 may be an irritant, an operator may choose to use protective gloves (such as the nitrile gloves 66 of FIG. 9) prior to the application of the solvent wipe.

In some embodiments, the outer surface is cleaned to a minimum St 2 finish prior to coating application. In this instance, the factory coating is abraded to a minimum width of 200 mm (approximately 8 inches) from the cutback edge or tie-ins to existing coatings using, for example, 40-80 grit abrasive paper, and the coating edges should be beveled, for example, with a grinder and a 40-80 grit flapwheel disc to eliminate the vertical edge.

Figure 3:
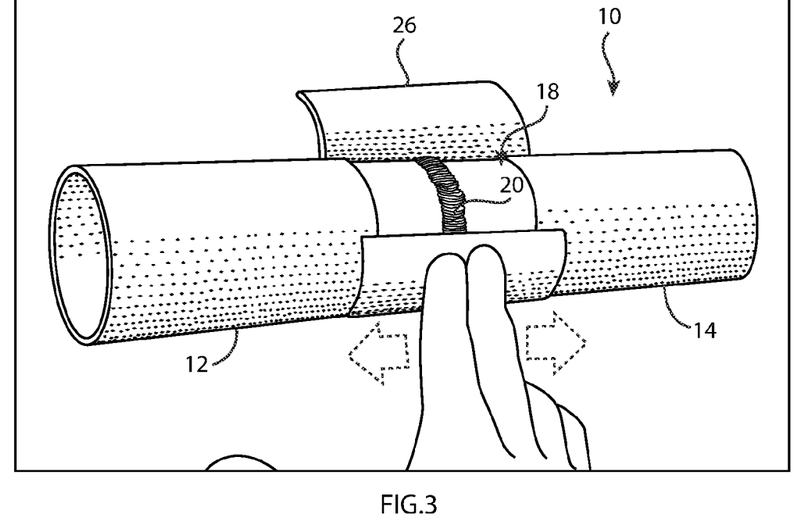
FIG. 3 is a perspective-view illustration of the exemplary pipeline assembly of FIGS. 1 and 2, showing the inner wrap being compressed and smoothed.

Following the surface preparation described above, a flexible, corrosion-resistant, polymeric inner wrap 26 is then applied over the joint region 18. In the embodiment illustrated in FIG. 2, the wrap 26 is wound around at least a portion of the first and second pipes 12, 14 such that the inner wrap 26 completely surrounds the joint region 18 (and, thus, the weld joint 20), and adheres to the outer surfaces of the joined pipes 12, 14. By way of illustration, and not limitation, the operator should remove any plastic release lining (not shown) from the inner wrap 26, and apply such that the inner wrap 26 extends across and circumscribes the joint region 18, overlapping each coating 16 by approximately 5 mm. In other embodiments, the inner wrap 26 is wrapped circumferentially around the pipe in the direction of pull at a 90° angle, applied with a minimum 10-mm (⅜-inch) overlap. In some applications, the operator wants to ensure that the inner wrap 26 overlaps the pipe coatings by at least approximately 50 mm (2 inches). The inner wrap 26 is applied with care to avoid air enclosures, but need not be applied with tension. For example, the operator may massage the inner wrap into the pipe surface. In one instance, the operator starts by pressing a finger inward on either side of the weld joint 22, and working the two fingers outward (e.g., transversely with respect to the pipeline assembly 10), as seen in FIG. 3. The working area should be kept dry during application.

Figure 4:
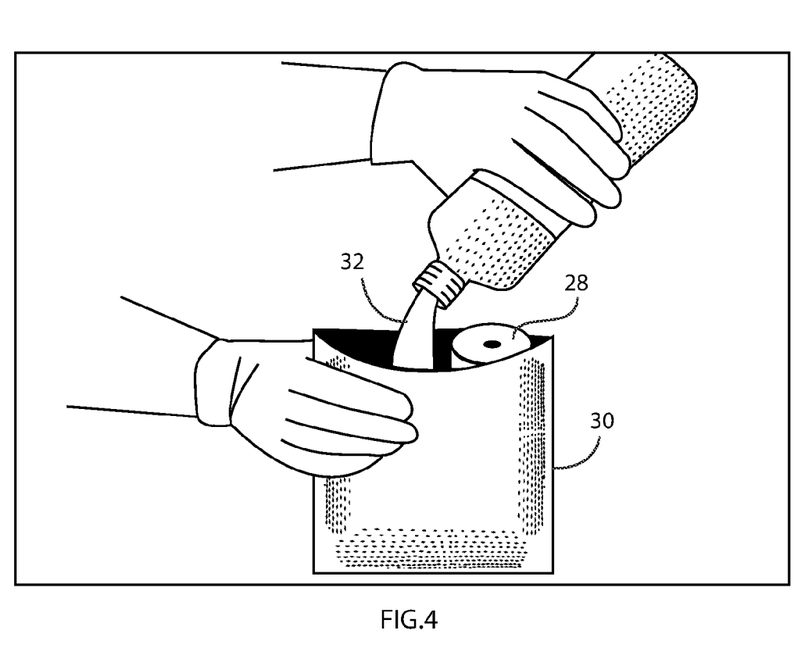
FIG. 4 is a perspective-view illustration of an exemplary flexible outer wrap in accordance with embodiments of the present disclosure, showing the outer wrap being activated via application of aqueous moisture.

With reference now to FIG. 4, once the polymeric inner wrap 26 is applied to the joint region 18, a flexible, woven fiberglass-composite outer wrap 28 is applied to the pipeline assembly 10. By way of example, each roll of composite wrap 28 may be provided in a pouch or foil bag 30. Prior to application and curing, the wrap 28 may be removed from the pouch 30, and briefly inspected to ensure that it is soft and pliable, and has not inadvertently preset.

During installation, the fiberglass-composite outer wrap 28 is completely wet on all surfaces at all times. Exposing the outer wrap 28 to aqueous moisture acts to activate the resin material in the outer wrap. As such, prior to laying the fiberglass-composite wrap 28, an operator may immerse the composite wrap 28 in an open container of water. In the illustrated embodiment, for example, water 32 is poured into the open foil pouch 30, submerging the outer wrap 28 in tepid water for approximately 10 seconds. The operator may then turn the wrap 28 in the pouch 30, squeezing lightly, to wet as much area of the wrap 28 as possible. It is also within the scope of the present disclosure to wrap the composite wrap 28 over the seal region 18, and thereafter apply sufficient aqueous moisture to catalyze the resinous pliable-plastic material contained within the woven filament fiberglass cloth. For applications in temperatures above 85° F. (30° C.), it may be desirable to use cold water to activate the composite wrap 28.

The fiberglass-composite outer wrap 28 is thereafter wrapped around the inner wrap 24 and at least a portion of the first and second pipes 12, 14 such that the outer wrap 28 completely surrounds the joint region 18 and inner wrap 26, adhering to the outer surfaces of the joined pipes 12, 14. In the embodiment illustrated in FIGS. 5 and 6, for example, the outer wrap 28 is wrapped such that first and second longitudinally-opposing ends 38 and 40 (FIG. 6) of the outer wrap 28 extend beyond respective first and second longitudinally-opposing ends 34 and 36 of the inner wrap 26 (FIG. 5). In some embodiments, the outer wrap 28 is applied at a distance of approximately 100 mm (4 inches) past the inner wrap 26.

By way of clarification, the operator may begin by pressing the first longitudinal end 38 of the outer wrap 28 approximately 4 cm beyond the first longitudinal end 34 of the inner wrap 26 with respect to the pipeline assembly 10. In some embodiments, the outer wrap 28 is then coiled in a spiral-bias method with an approximately 25-50% overlap (or at least approximately 50% overlap) in the same direction that the inner wrap 26 was applied (see FIGS. 5 and 6). Pressure may be applied during application of the outer wrap 28 by pulling firmly on the roll as it is applied. In some multi-layer applications, the first layer of outer wrap 28 is applied circumferentially around the pipe at a 90° angle, and subsequent layers at an approximately 75% overlap. In practice, the composite wrap 28 may be installed smoothly to minimize any unintentional bunching. Care may be taken to ensure that all air spaces and voids between the individual layers of wrap 28 are eliminated. Good adhesion between the layers can be accomplished with consistent pressure and firmly smoothing of the layers with the open palm of the hand in the direction the fiberglass composite wrap 28 is being applied.

It may be desirable, in some applications, to wrap the outer wrap 28 in the direction of drilling, starting on the trailing pipe (e.g., the second pipe 14) and ending on the leading pipe (e.g., the first pipe 12). In so doing, the forward-most end of the wrapped outer wrap 28 can consist of a single layer of fabric. In addition, any steps in the wrapped outer wrap 28 will be facing away from the direction of drilling. Both of the foregoing characteristics are desirable in directional drilling applications because they help to minimize damage to the protective seal assembly 24 when the pipeline assembly 10 is transitioning through the bore hole.

Figure 6:
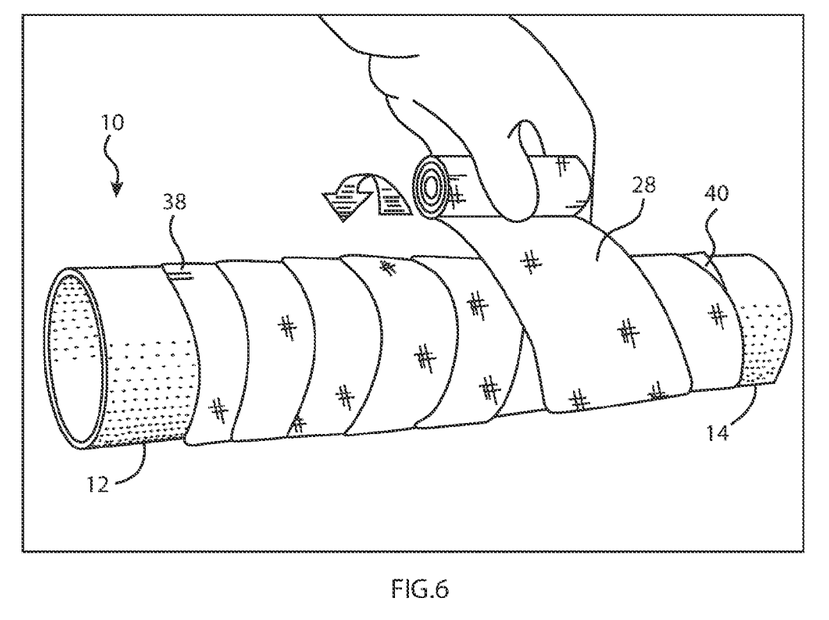
FIG. 6 is a perspective-view illustration of the exemplary pipeline assembly of FIGS. 1-3 and 5, showing the outer wrap being applied across the joint region of the pipeline assembly.

In other embodiments, once the operator has reached beyond the second longitudinal end 36 of the inner wrap 26 (e.g., approximately 2-5 cm), the operator may then continue to wind the outer wrap 28 back over itself until the entire roll is used. In so doing, the outer wrap 28 is wrapped such that at least two layers of woven fiberglass composite surround the joint region 18, as seen in FIG. 6. In some embodiments, the outer wrap 28 is applied such that a taper is provided between longitudinal ends of the protective seal 24. That is, the outer wrap 28 is applied such that the center of the seal 24 has a larger outer diameter than the two longitudinal ends thereof.

Figure 7:
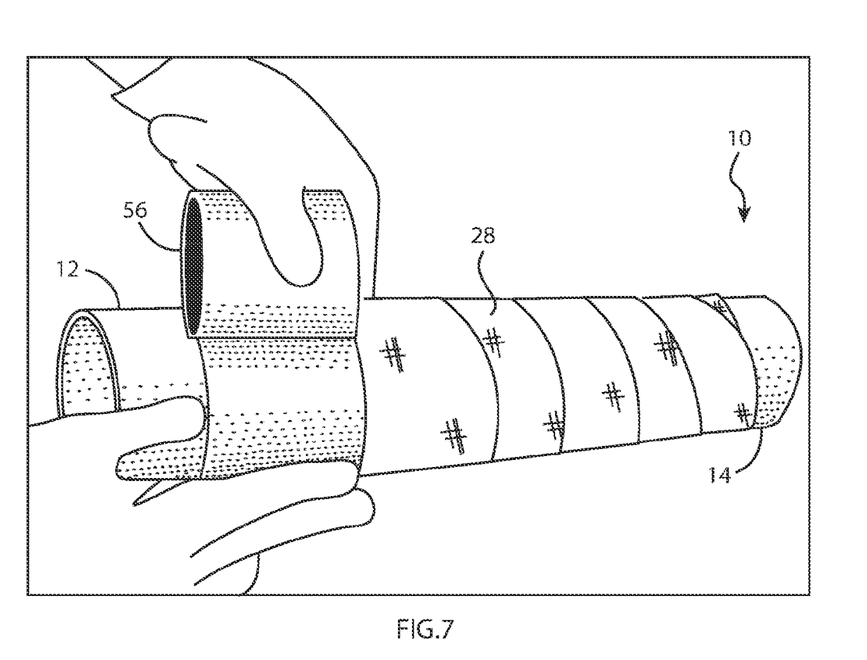
FIG. 7 is a perspective-view illustration of the exemplary pipeline assembly of FIGS. 1-3, 5 and 6, showing an exemplary elastic wrap being applied across the inner and outer wraps.

After the composite wrap 28 has been installed, the protective seal assembly 24 may be wrapped in one or more layers of elastic compression wrap 56, as seen in FIG. 7. According to the illustrated embodiment, the compression film 56 is wrapped in the same direction as the outer wrap 28 (e.g., from the leading pipe 12 to the trailing pipe 14), starting beyond the first longitudinal end 38 of the outer wrap 28. The entire seal assembly 24 is wrapped in two layers of compression wrap 56, pulling firmly during application thereof, to achieve a smooth finish and to maintain full contact on the loose ends. In some embodiments, the compression wrap 56 is applied in the same direction as the inner and outer wraps with an approximately 50% overlap, starting at approximately 50 mm (2 inches) beyond the longitudinal edges of the composite wrap 28.

The elastic compression wrap 56 should be perforated to allow excess water and any composite wrap bi-product gas to escape freely. In general, the perforations may be small holes dispersed throughout the elastic compression wrap 56. The perforations may be generated, for example, by tapping firmly on the compression wrap 56 with the metal bristles of the wire brush 68 or by using the perforator tool 58. The elastic compression wrap 56 is then removed after a predetermined period of time—e.g., approximately 10 minutes. In some embodiments, the composite wrap 28 is allowed to reach a Shore D Hardness of 70 prior to installing the pipeline assembly.

The foregoing exemplary method preferably includes those steps enumerated above. However, it is within the scope and spirit of the present disclosure to omit steps, include additional steps, and/or modify the order presented herein. It should be further noted that the above method represents a single sequence to create a single seal assembly. However, it is expected, as indicated above, that the method be applied at various locations along the pipeline assembly 10.

In accordance with other embodiments of the present disclosure, the outer wrap 28 can be used to join or otherwise mechanically couple the first and second pipes 12, 14 together. By way of background, polymeric pipes can be more difficult to join than metallic pipes. Plastic surfaces are different from metal, glass, or most other surfaces because they are often unstable and thermodynamically incompatible with the adhesives. In application where the first and second pipes 12, 14 are fabricated, at least in part, from polymeric materials (e.g., High Density Polyethylene (HDPE) and Polypropylene (PP)), it is envisioned that the outer wrap 28 provides sufficient bonding strength to couple the first pipe 12 to the second pipe 14. Such embodiments therefore eliminate the need for additional adhesives, mechanical coupling devices, and/or fastening procedures.

Lap shear is one of the most commonly used standardized tests for determining the strength of medium and high strength bonds. Some exemplary tests for measuring lap shear are ASTM D3163 (Lap Shear Strength of Adhesively Bonded Plastics), D3164 (Strength Properties of Adhesively Bonded Plastic Lap-Shear Sandwich Joints in Shear by Tension Loading), and ASTM D5868 (Lap Shear Adhesion for Fiber Reinforced Plastics (FRP)). Lap Shear Strength, which is typically measured in pounds per square inch (psi), can be determined by the following equation:

$$Pmax/A = Pmax/OL.b \quad (1)$$

where, Pmax=highest load in pounds (lb), OL=overlap length in inches (in), b=average sample width in inches, and A=bonded area in in$^2$. Lap shear testing can be performed using a 10,000 Load Capacity (lbf) ADMET™ Tensile Testing Machine with a strain rate of 0.5 mm/min for single lap shear testing and 5 in/min. Prior to conducting the testing, the outer surfaces of the plastic pipes where the outer wrap 28 will be applied can be prepared by cleaning to eliminate dust and grease, and applying a course emery cloth to rough the surfaces in order to promote better adhesion by mechanical interlocking.

Table 1, below, provides some exemplary lap shear results. In the testing scenario illustrated in Table 1, the inner wrap 26 was eliminated, and the outer wrap 28 was applied to provide the necessary bonding for the pipeline assembly 10. In Table 1, eight (8) layers of the outer wrap were wrapped around the two adjoining ends of HDPE pipes. Each sample was tested with 2, 4 and 6 in. overlap length. In the first exemplary test sample configuration, the maximum shear strength, 68.1 psi, was achieved at 2 in. overlap length. In the second exemplary test sample configuration, the maximum shear strength, 66.8 psi was achieved at 4 in. overlap length. High breaking loads in the of range 1300-1800 lbs were also achieved at 4 in. overlap length.

TABLE 1

| System | Overlap Length (inches) | Breaking Load (pounds) | Lap Shear Strength (psi) |
|---|---|---|---|
| Test Sample 1 (HDPE) | 2 | 958 | 68.1 |
|  | 4 | 1350 | 48.0 |
|  | 6 | 1254 | 29.7 |
| Test Sample 2 (HDPE) | 2 | 651 | 46.3 |
|  | 4 | 1800 | 66.8 |
|  | 6 | 1778 | 42.1 |

Table 2, below, provides some additional exemplary lap shear results. Unlike the test samples in Table 1, the test samples in Table 2 are mild steel with a fusion bonded epoxy (FBE) coating. In addition, prior to applying the outer wrap 28, the adjoined test pieces were cleaned with isopropanol to remove dust and grease. Each of the samples was tested with a 1 in. overlap length and 1 in. overlap width, thus providing an overlap area of approximately 1 sq. in. The three samples in Table 2 exhibited an average lap shear strength of approximately 808 psi with a standard of deviation of approximately 215 psi.

TABLE 2

| System | Sample (all with 1 in. overlap length) | Breaking Load (pounds) | Lap Shear Strength (psi) |
|---|---|---|---|
| FBE Coating | 1 | 654 | 654 |
|  | 2 | 718 | 718 |
|  | 3 | 1054 | 1054 |

While the disclosure has been described with reference to details of the illustrated embodiments, these details are not intended to limit the scope of the invention as defined in the appended claims. The disclosed embodiments and obvious variations thereof are contemplated as falling within the spirit and scope of the claimed invention.

What is claimed is:

1. A protective seal assembly for sealing at least one seal region of a pipeline assembly having an outer surface, the seal assembly comprising:
   a first wrap member wrapped around at least a portion of the at least one seal region and contacting the outer surface of the pipeline assembly, the first wrap member including a corrosion-resistant material; and
   a second wrap member wrapped around and circumscribing the first wrap member, the second wrap member including a self-adhering, fiberglass composite material, wherein the second wrap member exhibits a tensile strength of approximately 20,000 to 39,500 psi and an impact resistance of approximately 80 to 300 joules.

2. The protective seal assembly of claim 1, wherein the fiberglass composite material comprises a woven fiberglass cloth impregnated with a resinous pliable-plastic material.

3. The protective seal assembly of claim 2, wherein the impregnated fiberglass cloth is hardened via exposure to aqueous moisture.

4. The protective seal assembly of claim 1, wherein the corrosion-resistant material comprises a self-adhering polymer.

5. A protective seal assembly for sealing at least one seal region of a pipeline assembly having an outer surface, the seal assembly comprising:
   a first wrap member wrapped around at least a portion of the at least one seal region and contacting the outer surface of the pipeline assembly, the first wrap member including a corrosion-resistant material; and
   a second wrap member wrapped around and circumscribing the first wrap member, the second wrap member including a self-adhering, fiberglass composite material, wherein the corrosion-resistant material of the first wrap member comprises a self-adhering polymer, and the self-adhering polymer is a viscoelastic polyisobutene.

6. The protective seal assembly of claim 1, wherein the first and second wrap members collectively increase the outer diameter of the pipeline assembly by less than approximately 10 mm at the center of the protective seal assembly.

7. The protective seal assembly of claim 1, wherein the first wrap member has first and second longitudinally-opposing ends relative to the pipeline assembly, and wherein the second wrap member has first and second longitudinally-opposing ends extending beyond respective ends of the first wrap member.

8. The protective seal assembly of claim 1, wherein the second wrap member includes a first layer of fiberglass composite material wrapped around the first wrap member, and a second layer of fiberglass composite material wrapped around the first layer of fiberglass composite material.

9. A protective seal assembly for sealing at least one seal region of a pipeline assembly having an outer surface, the seal assembly comprising:
   a first wrap member wrapped around at least a portion of the at least one seal region and contacting the outer surface of the pipeline assembly, the first wrap member including a corrosion-resistant material; and
   a second wrap member wrapped around and circumscribing the first wrap member, the second wrap member including a self-adhering, fiberglass composite material, wherein the second wrap member exhibits an abrasion resistance of approximately 2.0 mils/second.

10. The protective seal assembly of claim 9, wherein the second wrap member exhibits a tensile strength of approximately 20,000 to 39,500 psi and an impact resistance of approximately 80 to 300 joules.

11. A protective seal kit for sealing at least one joint region between first and second pipes each having an outer surface, the protective seal kit comprising:
   a first flexible wrap configured to wrap around at least a portion of the outer surfaces of the first and second pipes and to substantially surround the at least one joint region, the first flexible wrap being at least partially fabricated from a corrosion-resistant material; and
   a second flexible wrap configured to wrap around at least a portion of the outer surfaces of the first and second pipes and to substantially surround the joint region and the first flexible wrap, the second flexible wrap being at least partially fabricated from a fiberglass cloth impregnated with a resinous pliable-plastic material configured to harden upon exposure to aqueous moisture,
   wherein the second flexible wrap, when hardened, exhibits a tensile strength of approximately 20,000 to 39,500 psi and an impact resistance of approximately 80 to 300 joules.

12. The protective seal kit of claim 11, further comprising an elastic wrap configured to surround the first and second flexible wraps and at least a portion of the first and second pipes, the elastic wrap comprising a perforable polyethylene film.

13. The protective seal kit of claim 12, further comprising a perforator tool configured to puncture the perforable polyethylene film to thereby generate a plurality of perforations in the elastic wrap.

14. A method for sealing at least one joint region between at least first and second pipes each having an outer surface, the method comprising:
   wrapping a flexible corrosion-resistant inner wrap around at least a portion of the first and second pipes such that the inner wrap substantially surrounds the joint region and adheres to the outer surfaces of the first and second pipes;
   wrapping a flexible fiberglass-composite outer wrap around the inner wrap and at least a portion of the first and second pipes such that the outer wrap substantially surrounds the inner wrap and adheres to the outer surfaces of the first and second pipes; and
   curing the flexible fiberglass-composite outer wrap such that the outer wrap exhibits a tensile strength of approximately 20,000 to 39,500 psi and an impact resistance of approximately 80 to 300 joules.

15. The method of claim 14, wherein the fiberglass-composite outer wrap comprises a fiberglass cloth impregnated with a resinous pliable-plastic material configured to harden upon exposure to aqueous moisture.

16. The method of claim 15, wherein curing of the outer wrap includes applying aqueous moisture to the flexible fiberglass composite outer wrap, and allowing the flexible fiberglass composite outer wrap to dry for a predetermined period of time.

17. A method for sealing at least one joint region between at least first and second pipes each having an outer surface, the method comprising:
   wrapping a flexible corrosion-resistant inner wrap around at least a portion of the first and second pipes such that the inner wrap substantially surrounds the joint region and adheres to the outer surfaces of the first and second pipes, wherein the inner wrap comprises a self-adhering, viscoelastic polyisobutene;
   wrapping a flexible fiberglass-composite outer wrap around the inner wrap and at least a portion of the first and second pipes such that the outer wrap substantially surrounds the inner wrap and adheres to the outer surfaces of the first and second pipes; and
   curing the flexible fiberglass composite outer wrap.

18. The method of claim 14, further comprising wrapping an elastic compression wrap around the fiberglass-composite outer wrap and at least a portion of the first and second pipes.

19. The method of claim 18, wherein the elastic compression wrap comprises a perforable polyethylene film.

20. The method of claim 19, further comprising puncturing the perforable polyethylene film to thereby generate a plurality of perforations in the elastic compression wrap.

21. The method of claim 14, wherein the outer wrap is wrapped such that first and second longitudinally-opposing ends of the outer wrap extend beyond respective first and second longitudinally-opposing ends of the inner wrap.

22. The method of claim 14, wherein the outer wrap is wrapped with at least a 50% overlap in the same direction as the inner wrap.

23. The method of claim 14, wherein the first pipe is a leading pipe and the second pipe is a trailing pipe, and wherein the outer wrap is wrapped in a direction of drilling starting on the trailing pipe and ending on the leading pipe.

24. The method of claim 14, wherein the respective outer surface of each pipe has a corrosion-resistant topcoat, the joint region comprising an interface between the first and second pipes and at least a portion of each pipe outer surface adjacent the interface sans a coating, the method further comprising:
   cleaning and roughening the entire joint region and at least a portion of each pipe outer surface with the topcoat thereon.

* * * * *